United States Patent [19]

Fowler

[11] Patent Number: 4,711,194
[45] Date of Patent: Dec. 8, 1987

[54] STREAMER INTERFACE ADAPTER CABLE MOUNTED LEVELER

[75] Inventor: John T. Fowler, Marblehead, Mass.

[73] Assignee: The Laitram Corporation, New Orleans, La.

[21] Appl. No.: 690,867

[22] Filed: Jan. 11, 1985

Related U.S. Application Data

[63] Continuation-in-part of Ser. No. 444,073, Nov. 24, 1982, and a continuation-in-part of Ser. No. 585,027, Mar. 5, 1984.

[51] Int. Cl.⁴ .............................................. B63G 8/14
[52] U.S. Cl. ..................................... 114/245; 367/17
[58] Field of Search .................. 114/245, 246; 367/17, 367/19, 20, 154

[56] References Cited

U.S. PATENT DOCUMENTS

| | | |
|---|---|---|
| 3,434,446 | 3/1969 | Cole . |
| 3,440,992 | 4/1969 | Chance ................................ 114/245 |
| 3,531,761 | 9/1970 | Tickell . |
| 3,605,674 | 9/1971 | Weese ................................. 114/245 |
| 3,931,608 | 1/1976 | Cole . |
| 4,204,188 | 5/1980 | Weichert et al. .................... 367/154 |
| 4,530,075 | 7/1985 | Pearson .............................. 367/20 |

Primary Examiner—Thomas H. Tarcza
Assistant Examiner—Ian J. Lobo
Attorney, Agent, or Firm—Weingarten, Schurgin, Gagnebin & Hayes

[57] ABSTRACT

A cable leveling device is attached to a streamer cable by providing an adapter module secured between two seismic streamer cable sections with one of the cable strain members secured to the adapter. An overlying coaxial housing is mounted for rotation about the adapter module so as to rotate with respect to the module. The overlying housing carries leveling apparatus in the form of paravanes as well as depth sensing and other apparatus, with the top part of the overlying housing containing a hollow or foam-filled buoyant portion, and with the bottom portion of the housing containing batteries, electronics and sensing devices, such that the housing is maintained in a vertical orientation because of its buoyant top portion and weighted bottom portion. The cable leveling device is secured not by collars to the resilient outer casing of a seismic streamer cable but rather to a rigid adapter module between cable sections, which in turn is secured to a single strain member, with the adapter providing a relatively short base line and thus a shorter leveling device. In one embodiment the housing is divided to provide a two-part clamshell arrangement clamped over the adapter module, with the adapter module having circumferential slots at either end thereof into which circumferential inwardly protecting ridges of the housing project such that rotation of the housing relative to the adapter module is facilitated.

12 Claims, 9 Drawing Figures

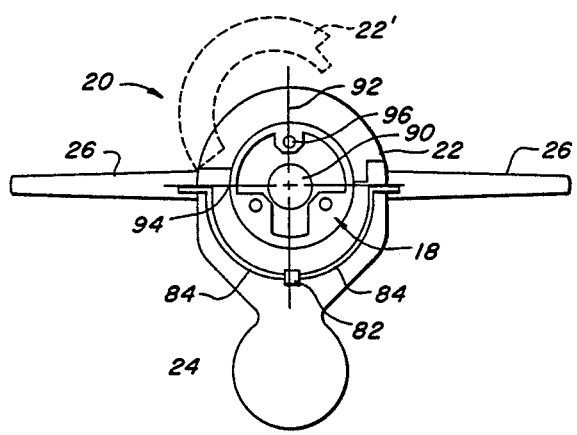
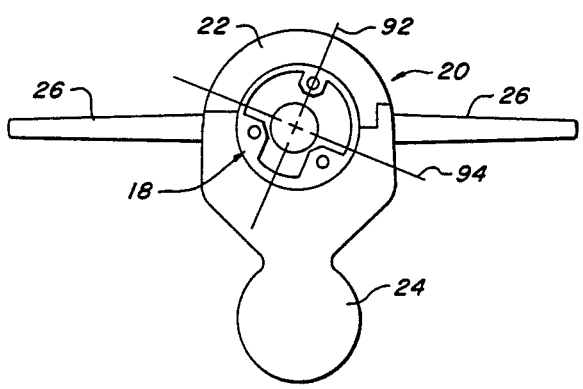
FIG. 4A    FIG. 4B
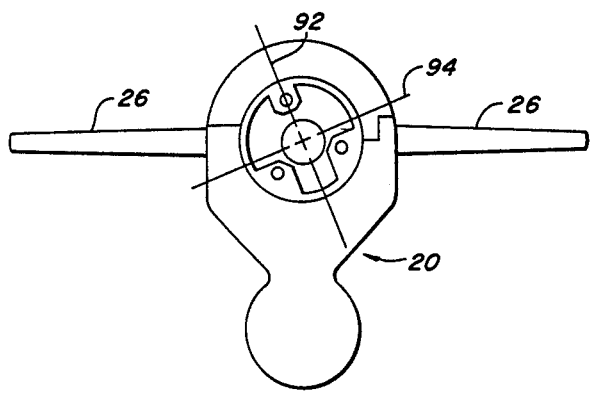
FIG. 4C
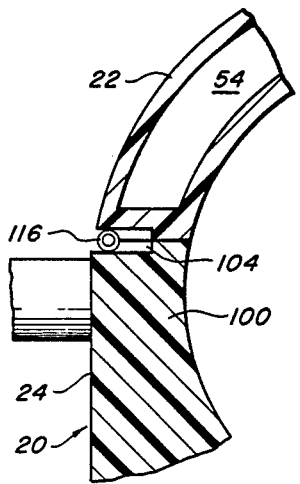
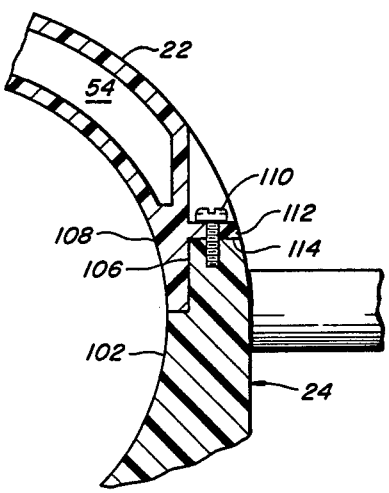
FIG. 5A    FIG. 5B

STREAMER INTERFACE ADAPTER CABLE MOUNTED LEVELER

CROSS REFERENCE TO RELATED APPLICATIONS

This application is a continuation-in-part of applications Ser. No. 444,073 filed Nov. 24, 1982 and Ser. No. 585,027 filed Mar. 5, 1984.

FIELD OF INVENTION

This invention relates to streamer cable positioning and leveling and, more particularly, to a leveling device which attaches not to the outer resilient skin of the cable but rather to a rigid adapter module connected between two cable sections.

BACKGROUND OF THE INVENTION

As exemplified by U.S. Pat. Nos. 3,531,761; 3,673,556; 3,931,608; and 3,611,975, various devices commonly termed 'birds' utilize paravane structures to provide for the leveling of a seismic streamer cable. In all of these devices, vanes or wings are utilized to position the cable and, in most instances, the birds are free to rotate freely about the seismic streamer cable having been mounted either above, below, or to the side of the cable by means of collars attached to the skin of the cable. In all of these devices the bird is secured to the resilient outer skin of the seismic streamer cable which increases positional error of the bird vis-a-vis the center line of the cable due to the resiliency of the skin.

In U.S. Pat. No. 3,434,446, a bird with paravane structure is mounted with the seismic cable therethrough. In this patent the bird rotates about the flexible cable which causes alignment uncertainty due to cable flexibility.

It will be appreciated that with no accurately maintained orientation of the bird relative to the cable center line, control of the cable by use of the paravanes introduces errors which are the result both of the resiliency of the cable and any short base line length. As a result a relatively long base line length is used which results in a relatively long device. The long base line length is utilized so that the bird is accurately aligned with the center line of the cable, this being especially important when the bird is fitted with a heading sensor.

It will be appreciated that seismic streamer cables are provided with strain members, usually three in number, which are placed under considerable tension during the towing operation. The tension can exceed 3,000 pounds such that any one of the strain relief members establishes the cable center line with a relatively high degree of accuracy. However, the skin of the cables being resilient often introduces a canting or other errors when birds are attached merely to the cable skin.

As described in U.S. patent application Ser. No. 444,073, filed Nov. 24, 1982, by John T. Fowler, entitled System for Removably Housing and Aligning Components of Towed Array and assigned to the Assignee hereof, and also in U.S. patent application Ser. No. 585,027, filed Mar. 5, 1984, also by John T. Fowler, entitled System for Removably Housing Alignment and Aligning Component in a Towed Array and assigned to the Assignee hereof, both applications being included herein by reference, it is pointed out that the utilization of a tubular adapter module placed between the ends of adjacent seismic cable sections can be utilized for a variety of different purposes, mainly in the alignment of sensitive devices such as compasses and transducing equipment to the center line of the cable. The reason that this alignment is maintained is that the center line is established by virtue of securing the adapter module to only one of the strain members which is utilized in the seismic cables. This is accomplished by clamping only one of the strain members to the module such that the module is maintained parallel to the longitudinal center line of the cable. The other strain members run through the module and are free to move in the channels provided. Thus the adapter module is keyed to one and only one strain member, thereby eliminating skewing forces which would be the case if the other strain members were rigidly attached to the adapter module. The adapter module in general is of a diameter similar to that of the cable and is secured between the cable sections both by the securing of the strain members within the adapter module to those carried by the cable sections as well as by clamping the outer skin of the ends of the cable sections to the adapter module ends.

In summary, the aforementioned adapter modules are utilized to house components and to provide alignment of the adapter module and its components with one strain member and thus the center line of the cable.

SUMMARY OF THE INVENTION

A cable leveling device or bird is provided in which a housing carrying wings or paravanes is rotatably secured to an adapter module between two cable sections. More specifically, the adapter module is relatively short and relatively easily attached between the ends of adjacent cable sections. The module provides a relatively rigid base which is aligned with the longitudinal axis of the cable. In the subject invention the adapter module is provided with annular mating means including grooves, channels or slots at either end. An overlying housing carrying cable leveling and control apparatus is coaxially mounted over the adapter module. The housing is adapted to rotate about the adapter module, with the housing being provided with corresponding annular mating means including inwardly-directed ridges fitting into the annular slots in the module. The housing in one embodiment includes a clamshell of two parts with an upper portion being provided with a hollow or foam-filled chamber to provide buoyancy for the leveling device or bird and to maintain a vertical orientation of the housing in combination with the weight of the components in the lower portion of the housing. The lower part is weighted by the apparatus carried therein which not only operates the paravanes which are attached to the lower portion of the outer housing in one embodiment but also includes depth sensors, compass heading devices and other electrical apparatus usually contained within a bird. This apparatus is inductively coupled to the seismic streamer cable through coils carried both in the lower housing portion and in a breech in the adapter module. This electrically connects the bird to the cable.

The housing which coaxially surrounds the adapter module is on a relatively short center line and in one embodiment is a hinged affair with the top cover being hingedly attached to the bottom portion and clamped over the adapter module such that the aforementioned annular grooves and ridges mate.

What is provided is a streamlined, neutrally buoyant bird with the neutral buoyancy being provided in part by the hollow and foam-filled upper portion of the coaxially-mounted housing and in part by positively buoyant wings. A coil is carried both in the breech of the adapter module and in the lower portion of the housing for inductive coupling purposes. The wings are carried on the lower portion of the housing and are rotated about the cable center line as opposed to being spaced from the longitudinal center line of the cable. The mounting system is rigid, providing alignment accuracy. Noise reduction is provided by the subject device since there is no need for the use of an extra tube to maintain the upright position in buoyancy. Because only one strain member is attached to the adapter module, the housing is maintained in alignment with the cable center line due to the 1,000 to 3,000 pounds of tension involved. The bird is mounted on a short base line length because of the rigid attachment, with the long base line length of the prior art devices being avoided. Thus the subject cable leveling device can be made exceedingly short.

BRIEF DESCRIPTION OF THE DRAWINGS

These and other features of the subject invention will be better understood in connection with the drawings of which:

FIGS. 4A, 4B and 4C illustrate the vertical orientation of the housing regardless of cable twist;

FIGS. 5A and 5B are sectional views of a portion of the coaxial overlying housing illustrating the hollow nature of the upper portion of the housing and its hinged structure and clamping means.

DETAILED DESCRIPTION

Figure 1:
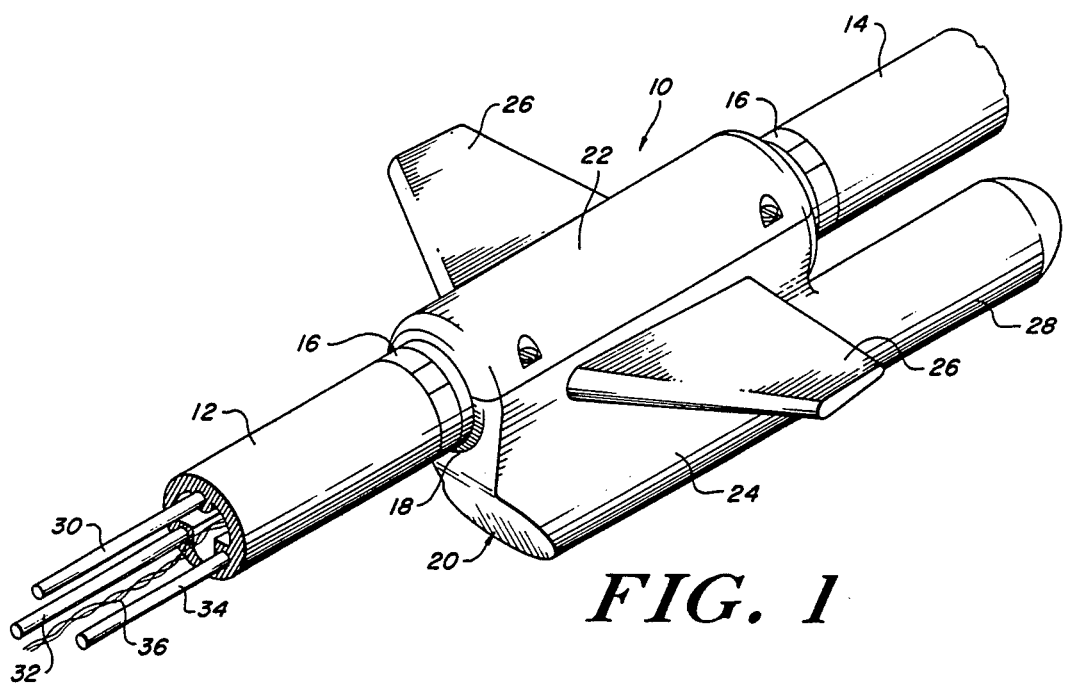
FIG. 1 is a diagrammatic illustration of the subject bird mounted to an adapter module which is secured to the ends of two adjacent cable sections.

Referring now to FIG. 1, a streamer interface adapter cable mounted leveler or bird 10 is mounted between streamer cable sections 12 and 14 via punch lock bands 16 which, as will be discussed, secure the streamer cable sections to an adapter module 18. As illustrated in this embodiment, an outer overlying housing generally indicated by the reference character 20 includes a top clamshell portion 22 and a bottom portion 24 which carries wings 26 that are neutrally buoyant. Bottom portion 24 includes a cylinder 28 which carries, inter alia, the electromechanical apparatus for positioning wings 26, batteries and other electronic sensors and circuits.

As can be seen from the bottom left-hand portion of this figure, cable section 12 typically includes strain members 30, 32 and 34 which run longitudinally through the cable as illustrated. Interconnection wires 36 are also shown and are connected via connectors (not shown) to the adapter module 18 such that bird 10 and the electronics contained therein are inductively coupled to these lines which transmit the information to and from a towing vessel (not shown).

Figure 2:
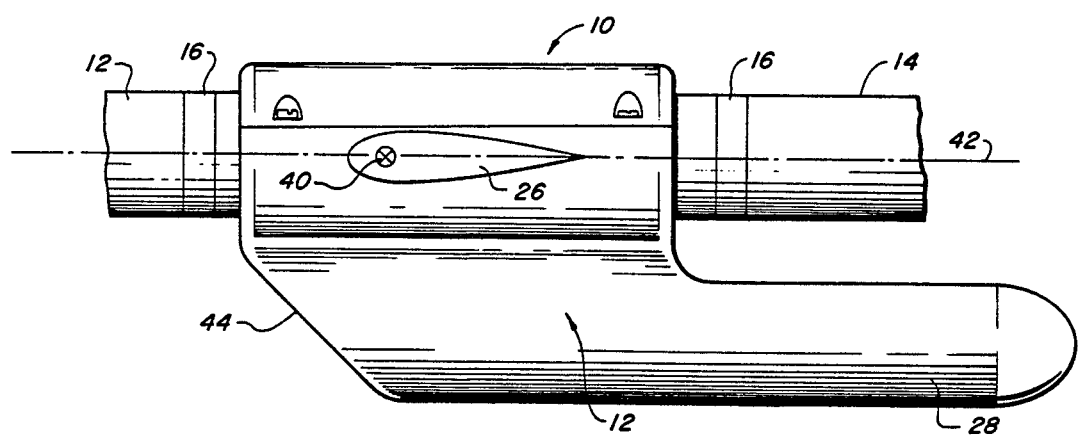
FIG. 2 is a side view of the apparatus of FIG. 1 illustrating the carriage of the paravane or wing by the lower section of the rotatable outer housing, with the ballasting and electronics being provided beneath the paravane or wing.

Referring to FIG. 2, a side view of the bird of FIG. 1 is shown in which one of the wings is seen to be pivoted about point 40, which in the preferred embodiment is along the longitudinal center line 42 of the cable made up of sections 12 and 14. It will be appreciated that a front portion 44 of the bottom portion 24 of housing 20 is canted for streamlining purposes.

Figure 3:
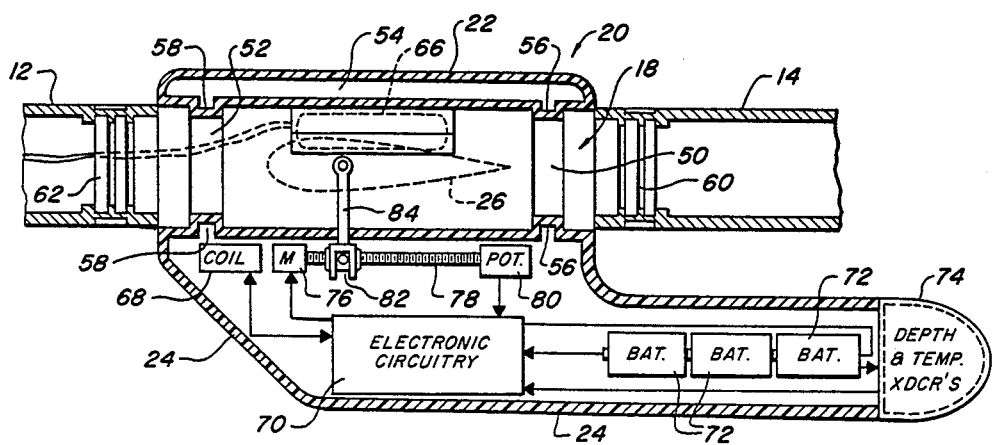
FIG. 3 is a schematic and sectional view of the utilization of the adapter module, with its annular end channels cooperating with the ridges of the coaxially-mounted overlying housing.

Referring now to FIG. 3, it can be seen that in one embodiment adapter 18 is provided with annular grooves or channels 50 and 52 at either end thereof and that top portion 22 of housing 20 is provided with a cavity 54 which may be foam-filled or left open, the purpose of the cavity being to provide buoyancy. Top portion 22 as well as bottom portion 24 are provided with inwardly-directed annular ridges 56 and 58 which mate respectively with channels 50 and 52 such that the entire housing is designed to rotate freely about adapter module 18. In this diagram the outer casings of cable sections 12 and 14 are clamped to ridged end portions 60 and 62 of adapter module 18.

In one embodiment, adapter module 18 is provided with a breech shown in dotted outline at 64 which houses a coupling coil 66 which is inductively coupled to a coil 68 carried in the bottom portion of the housing. This provides for the coupling of signals from electronic circuitry 70 carried within the bottom portion of housing 20 to the cable-carried conductors. The electronic circuitry is powered by batteries 72, as are depth and temperature tranducers 74 carried in a faired pod at the aft end of housing 20.

Electronic circuitry 70 is provided to activate a motor 76 which drives a screwdrive 78 having its other end attached to a potentiometer 80 which provides information as to the position of a yoke 82 and therefore the position of wings 26 which are linked to yoke 82 via linkage 84.

Referring to FIGS. 4A and 4B, cable 90 is oriented as shown by axes 92 and 94, with strain member 96 being fixedly attached to module 18. Yoke 82 and linkages 84 are shown as being coupled to wings 26 to position the wings at the appropriate angle for leveling purposes. Also shown in this embodiment in dotted outline 22' is the top portion of housing 20, illustrating the ability to clamp the housing to the associated module. As illustrated in FIG. 4B, twisting the cable causes an off centering of axes 92 and 94 to the right, which causes a rotation of adapter module 18. However, as can be seen, housing 20 is maintained in a vertical position with the wings 26 in a horizontal position. This orientation is maintained both by the buoyancy of top portion 22 and the ballasting of bottom portion 24. The same situation is illustrated for an opposite twist of the cable as illustrated in FIG. 4C in which axes 92 and 94 are rotated to the left.

Referring now to FIGS. 5A and 5B, the hinged structure of housing 20 is illustrated in which portions 100 and 102 of bottom portion 24 of housing 20 are provided respectively with a hinge receiving groove 104 and a groove 106 adapted to receive a mating portion 108 of top housing portion 22. A screw 110 or other clamping device is provided to clamp a ledge portion 112 to a top surface 114 of portion 102. A hinge 116 is provided between housing portion 22 and housing portion 24 as illustrated. It should be noted that cavity 54, which provides buoyancy for the bird, may be filled with foam to provide the required neutral buoyancy of the bird.

Figure 6:
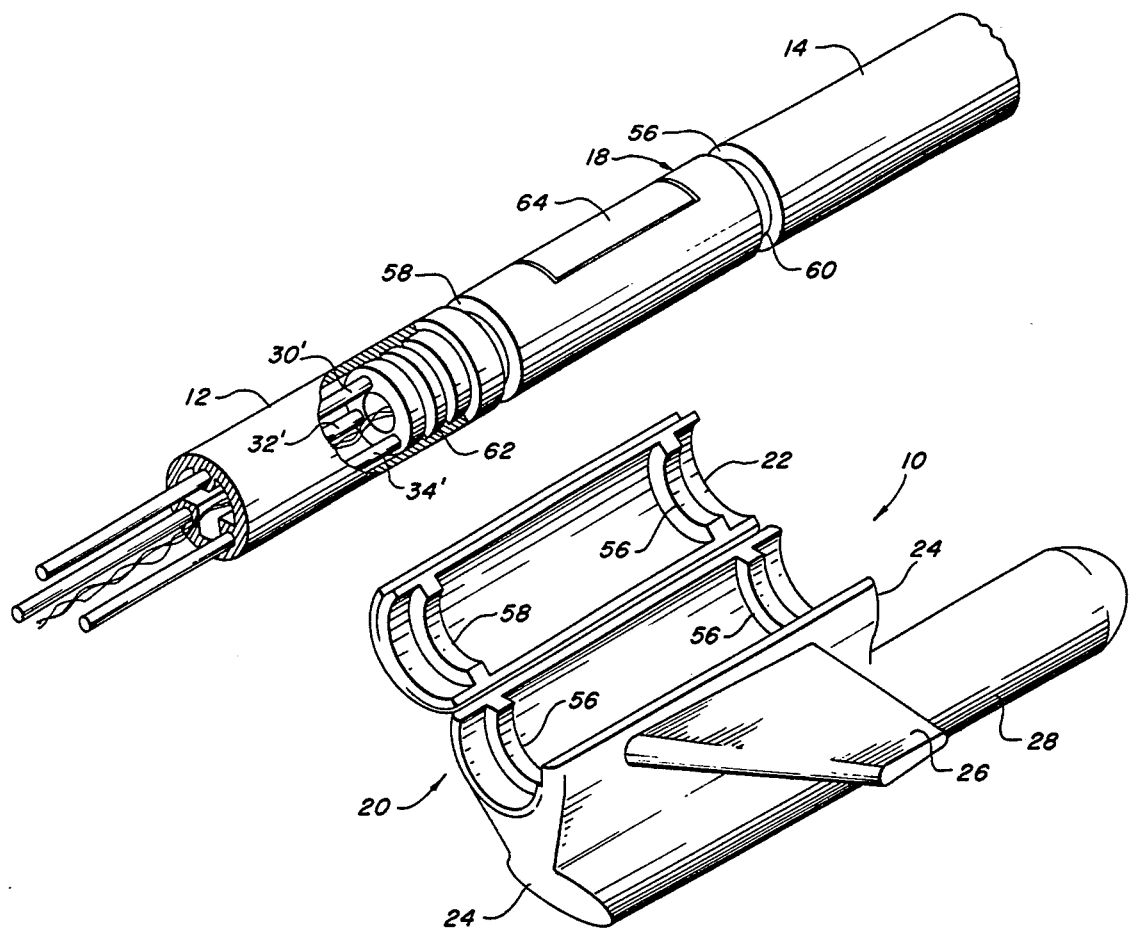
FIG. 6 is a diagrammatic illustration showing sections of cable attached to an adapter module to which is to be attached a bird having a hinged exterior shell and inwardly-directed annular ribs which cooperative with the annular channels in the adapter module.

Referring to FIG. 6, adapter module 18 is illustrated as having the aforementioned breech 64, with the annular channels 56 and 58 clearly in evidence. Also shown in this figure are end portions 60 and 62 which protrude into the ends of cable sections 12 and 14. Strain member 30' is secured to adapter module 18, whereas strain members 32' and 34' are permitted via channels in the adapter module to move longitudinally in both directions such that adapter module 18 is keyed to only one of the strained members. The adapter module may be fabricated with strain members 30', 32' and 34' extending from either end of the module, with these strain members being attached to the strain members of the cable sections in any conventional manner.

Bird 10 is shown in the clamshell embodiment with top clamshell portion 22 opened backwardly and with inwardly-directed ridges 56 and 58 being oriented perpendicular to the center line of housing 20. As can be seen, bottom portion 24 is provided with similar ridges 56 and 58 such that when the housing is clamped over adapter module 18 circumferential ridges exist and lie within the grooves of the associated ends of adapter module 18.

What has been provided is a bird which is readily attachable to a seismic streamer cable by virtue of utilization and of the adapter module and which is maintained in its vertical orientation both by the ballasting of the lower portion of the housing and by the buoyancy provided by the upper portion of the housing. In one embodiment, the wings are made to rotate about the center line of the cable which provides for more accurate cable positioning. It will be noted that the subject system is a rigid system to eliminate the problems of attaching a bird to the resilient outer sleeve or skin of a cable, thereby reducing noise and providing for more accurate positioning of the wings or paravanes of the bird.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. A cable leveling device adapted to be attached to a streamer cable comprising:
    an adapter module adapted to be secured between two streamer cable sections, said module including an inner housing adapted to be attached at either end to a section end and an overlying housing adapted to rotate about said inner housing and including wings mounted to said overlying housing for rotation about a horizontal axis, said overlying housing including, an elongated weighted pod-like structure containing apparatus operably connected to control said wings, wherein:
    said adapter module includes a first coil electrically connected to said streamer cable,
    said overlying housing includes a second coil inductively coupled to said first coil and connected to electro-mechanical means, permitting an exchange of signals between said cable at said electro-mechanical means.

2. The device of claim 1 wherein said sections have strain members, one of said strain members attached to said module inner housing for the alignment of said module to the longitudinal axis of said one strain member.

3. The device of claim 1 wherein said wings and a portion of said module above said pod-like structure are positively buoyant.

4. The device of claim 1 wherein said overlying housing includes a clamshell portion adapted to open up to slip over said inner housing and to clamp around said inner housing in a closed position.

5. The device of claim 1 wherein said inner housing has annular mating means at either end thereof and wherein said overlying housing has corresponding annular mating means to permit relative rotation of the housings while limiting longitudinal movement between the two housings.

6. The device of claim 5 wherein said annular mating means includes cooperating ridges and grooves.

7. The device of claim 5 wherein said overlying housing includes a clamshell portion and means for clamping said clamshell portion shut over said inner housing such that said annular mating means mate.

8. The device of claim 7 wherein said clamping means includes circumferential straps about the ends of said overlying housing.

9. The device of claim 1 wherein the top portion of said overlying housing is positively buoyant.

10. The device of claim 9 wherein said top portion is partially hollow and is foam filled.

11. The device of claim 1 wherein said overlying housing includes a clamshell portion and overlying circumferential straps at either end for maintaining said clamshell portion shut.

12. The device of claim 1 wherein said wings are located on said overlying housing such that said horizontal axis passes through the longitudinal axis of said adapter module.

* * * * *